(12) United States Patent
Baines

(10) Patent No.: US 10,799,074 B1
(45) Date of Patent: *Oct. 13, 2020

(54) LAMINATED SHOWER CURTAINS

(71) Applicant: Maytex Mills, Inc., New York, NY (US)

(72) Inventor: David M. Baines, Bedford, NY (US)

(73) Assignee: Maytex Mills, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,250

(22) Filed: Jun. 30, 2020

Related U.S. Application Data

(63) Continuation of application No. 15/197,213, filed on Jun. 29, 2016.

(Continued)

(51) Int. Cl.
*A47K 3/38* (2006.01)
*B32B 33/00* (2006.01)
(Continued)

(52) U.S. Cl.
CPC .............. *A47K 3/38* (2013.01); *B29C 48/022* (2019.02); *B29C 48/08* (2019.02); *B29C 48/21* (2019.02); *B32B 3/06* (2013.01); *B32B 5/024* (2013.01); *B32B 5/026* (2013.01); *B32B 5/08* (2013.01); *B32B 7/02* (2013.01); *B32B 7/12* (2013.01); *B32B 27/12* (2013.01); *B32B 27/32* (2013.01); *B32B 27/322* (2013.01); *B32B 27/34* (2013.01); *B32B 27/36* (2013.01); *B32B 27/365* (2013.01); *B32B 27/40* (2013.01); *B32B 33/00* (2013.01); *B29L 2007/002* (2013.01); *B29L 2009/00* (2013.01); *B32B 37/0038* (2013.01); *B32B 37/153* (2013.01); *B32B 37/203* (2013.01); *B32B 38/164* (2013.01);
(Continued)

(58) Field of Classification Search
CPC ........................................................ A47K 3/38
See application file for complete search history.

(56) References Cited

U.S. PATENT DOCUMENTS

| | | | |
|---|---|---|---|
| 3,528,849 | A | 9/1970 | Vullo et al. |
| 4,118,526 | A | 10/1978 | Gregorian et al. |

(Continued)

FOREIGN PATENT DOCUMENTS

| | | |
|---|---|---|
| CN | 103750720 | 4/2014 |
| FR | 2435347 | 4/1980 |

OTHER PUBLICATIONS

Tsao et al., "Novel N-Halamine Disinfectant Compounds", Biotechnol. Prog., 1991, vol. 7, No. 1, pp. 60-66.

(Continued)

*Primary Examiner* — J C Jacyna
(74) *Attorney, Agent, or Firm* — Christopher J. Owens; Alan G. Towner; Leech Tishman Fuscaldo & Lampl

(57) ABSTRACT

Laminated shower curtains are disclosed having an antimicrobial pre-treated fabric layer comprising a first antimicrobial agent, and an antimicrobial liquid impermeable film layer bonded to the antimicrobial pre-treated fabric layer comprising a polymeric material and a second antimicrobial agent. The antimicrobial pre-treated fabric layer and the antimicrobial pre-treated fabric layer of the laminated shower curtains may be individually produced before being bonded together.

30 Claims, 3 Drawing Sheets

Related U.S. Application Data

(60) Provisional application No. 62/185,996, filed on Jun. 29, 2015.

(51) Int. Cl.

| | | |
|---|---|---|
| *B32B 27/40* | (2006.01) | |
| *B32B 7/02* | (2019.01) | |
| *B32B 27/36* | (2006.01) | |
| *B32B 5/02* | (2006.01) | |
| *B32B 7/12* | (2006.01) | |
| *B32B 27/32* | (2006.01) | |
| *B32B 3/06* | (2006.01) | |
| *B29C 48/00* | (2019.01) | |
| *B32B 5/08* | (2006.01) | |
| *B32B 27/34* | (2006.01) | |
| *B29C 48/08* | (2019.01) | |
| *B29C 48/21* | (2019.01) | |
| *B32B 27/12* | (2006.01) | |
| *B32B 37/20* | (2006.01) | |
| *B32B 38/00* | (2006.01) | |
| *B32B 37/00* | (2006.01) | |
| *B32B 37/15* | (2006.01) | |
| *B29L 7/00* | (2006.01) | |
| *B29L 9/00* | (2006.01) | |

(52) U.S. Cl.
CPC ............. *B32B 2262/0261* (2013.01); *B32B 2262/0276* (2013.01); *B32B 2262/062* (2013.01); *B32B 2262/14* (2013.01); *B32B 2264/102* (2013.01); *B32B 2264/104* (2013.01); *B32B 2264/105* (2013.01); *B32B 2264/12* (2013.01); *B32B 2270/00* (2013.01); *B32B 2307/718* (2013.01); *B32B 2307/7145* (2013.01); *B32B 2307/7242* (2013.01); *B32B 2307/7265* (2013.01); *B32B 2307/73* (2013.01); *B32B 2307/732* (2013.01); *B32B 2419/00* (2013.01); *B32B 2607/00* (2013.01)

(56) References Cited

U.S. PATENT DOCUMENTS

| | | |
|---|---|---|
| 4,183,836 A | 1/1980 | Wolfe, Jr. |
| 4,208,173 A | 6/1980 | Gregorian et al. |
| 4,401,712 A | 8/1983 | Morrison |
| 4,835,019 A | 5/1989 | White et al. |
| 5,126,138 A | 6/1992 | McGee et al. |
| 5,358,780 A | 10/1994 | Kafchinski et al. |
| 5,399,419 A | 3/1995 | Porter et al. |
| 5,565,265 A | 10/1996 | Rubin et al. |
| 5,747,392 A | 5/1998 | Xiao et al. |
| 6,136,730 A | 10/2000 | Kimbrell, Jr. et al. |
| 6,203,872 B1 | 3/2001 | Hannon |
| 6,251,210 B1 | 6/2001 | Bullock et al. |
| 6,541,138 B2 | 4/2003 | Bullock et al. |
| 6,591,432 B1 | 7/2003 | Feinstein et al. |
| 6,884,491 B2 | 4/2005 | Rubin et al. |
| 7,157,388 B2 | 1/2007 | Langley et al. |
| 7,524,551 B2 | 4/2009 | Fang et al. |
| 7,531,219 B2 * | 5/2009 | Rubin ................ B32B 5/02 427/379 |
| 9,284,683 B2 | 3/2016 | Arnold et al. |
| 2004/0102113 A1 | 5/2004 | Demott et al. |
| 2005/0249791 A1 | 11/2005 | Hobbs et al. |
| 2006/0292323 A1 * | 12/2006 | Hutchinson ............. C08J 7/04 428/36.91 |
| 2010/0210745 A1 * | 8/2010 | McDaniel ............ C09D 5/1668 521/55 |
| 2011/0240064 A1 * | 10/2011 | Wales ................... A01N 37/46 134/26 |
| 2015/0011137 A1 * | 1/2015 | Kollner ................... B05D 5/00 442/83 |
| 2016/0037974 A1 | 2/2016 | Chung |
| 2016/0374518 A1 * | 12/2016 | Baines ................. B29C 48/022 4/608 |

OTHER PUBLICATIONS

Rizzotto, "Metal Complexes as Antimicrobial Agents", Chapter 5—A Search for Antibacterial Agents, Sep. 19, 2012, pp. 73-88, http://www.intechopen.com/books/a-search-for-antibacterial-agents.

Windler et al., "Comparative evaluation of antimicrobials for textile applications", Environmental International 53, 2013, pp. 62-73.

* cited by examiner

LAMINATED SHOWER CURTAINS

CROSS-REFERENCE TO RELATED APPLICATION

This application is a continuation of U.S. patent application Ser. No. 15/197,213 filed Jun. 29, 2016, which claims the benefit of U.S. Provisional Patent Application Ser. No. 62/185,996, filed on Jun. 29, 2015, which are incorporated herein by reference.

FIELD OF THE INVENTION

The present invention relates to shower curtains having water repellency and mildew resistance.

BACKGROUND INFORMATION

The shower curtain industry has struggled and failed to produce a fabric liner that combines the needed water repellency and passes standard testing for mildew resistance. Conventionally, the problem faced by the industry was that two different chemical treatments previously used to accomplish a water impermeable and mildew resistant fabric fought each other. Accordingly, a need exists for shower curtains having an improved combination of water repellency and mildew resistance.

SUMMARY OF THE INVENTION

The present invention provides laminated shower curtains having an antimicrobial pre-treated fabric layer comprising a first antimicrobial agent, and an antimicrobial liquid impermeable film layer bonded to the antimicrobial pre-treated fabric layer comprising a polymeric material and a second antimicrobial agent. The antimicrobial pre-treated fabric layer and the antimicrobial pre-treated fabric layer of the laminated shower curtains may be individually produced before being bonded together.

An aspect of the present invention is to provide a laminated shower curtain comprising an antimicrobial pre-treated fabric layer comprising a first antimicrobial agent, and an antimicrobial liquid impermeable film layer bonded to and in contact with the antimicrobial pre-treated fabric layer comprising a polymeric material and a second antimicrobial agent, wherein the antimicrobial liquid impermeable film layer comprises a composite layer including a polymeric matrix with molecules or particles of the second antimicrobial agent dispersed therein, and the laminated shower curtain is impermeable to water vapor.

Another aspect of the present invention is to provide a method of making a laminated water vapor-impermeable shower curtain material comprising laminating an antimicrobial pre-treated fabric layer comprising a first antimicrobial agent with an antimicrobial liquid impermeable film layer comprising a polymeric material and a second antimicrobial agent to produce a laminated shower curtain material that is impermeable to water vapor, wherein the antimicrobial liquid impermeable film layer is produced by co-extruding a molten mixture of the polymer material and the second antimicrobial agent to thereby form a polymeric matrix with molecules or particles of the second antimicrobial agent dispersed therein.

These and other aspects of the present invention will be more apparent from the following description.

DETAILED DESCRIPTION

The present invention provides laminated shower curtains that combine water repellency and mildew resistance. Instead of obtaining water repellency of a fabric layer with chemicals, the laminated shower curtains of the present invention comprise a fabric layer laminated with a liquid impermeable film layer. Before lamination, the fabric layer of the laminated shower curtain is pre-treated with an antimicrobial agent. The liquid impermeable film layer may include a co-extrusion of polymer material and a second antimicrobial agent.

As used herein, the term "shower curtain" includes curtains for use with a shower, a bath, or the like. The term "curtain" may refer to a single curtain that is used by itself in a shower or bath, or is used as a liner for an additional curtain.

As used herein, the term "antimicrobial" means substances, such as bactericidal, fungicidal, antiviral and the like, that kill or inhibit the growth of microorganisms.

As used herein, the term "liquid impermeable" means impermeable or substantially impermeable to liquids, such as water. For example, a liquid impermeable film layer of the present invention prevents liquid water from flowing through the thickness of the film.

As used herein, the term "liquid permeable" means permeable or substantially permeable to liquids, such as water. For example, a liquid permeable fabric layer of the present invention, prior to lamination with the film layer, allows at least some liquid water to flow through the thickness of the fabric.

As used herein, the term "gas impermeable" means impermeable or substantially impermeable to gas or vapor, such as water vapor, air and the like. For example, a gas impermeable film layer of the present invention prevents water vapor and/or air from passing through the thickness of the film.

As used herein, the term "gas permeable" means permeable or substantially permeable to gas or vapor, such as water vapor, air and the like. For example, a gas permeable fabric layer of the present invention, prior to lamination with the film layer, allows at least some passage of water vapor and/or air through the thickness of the fabric.

Figure 1:
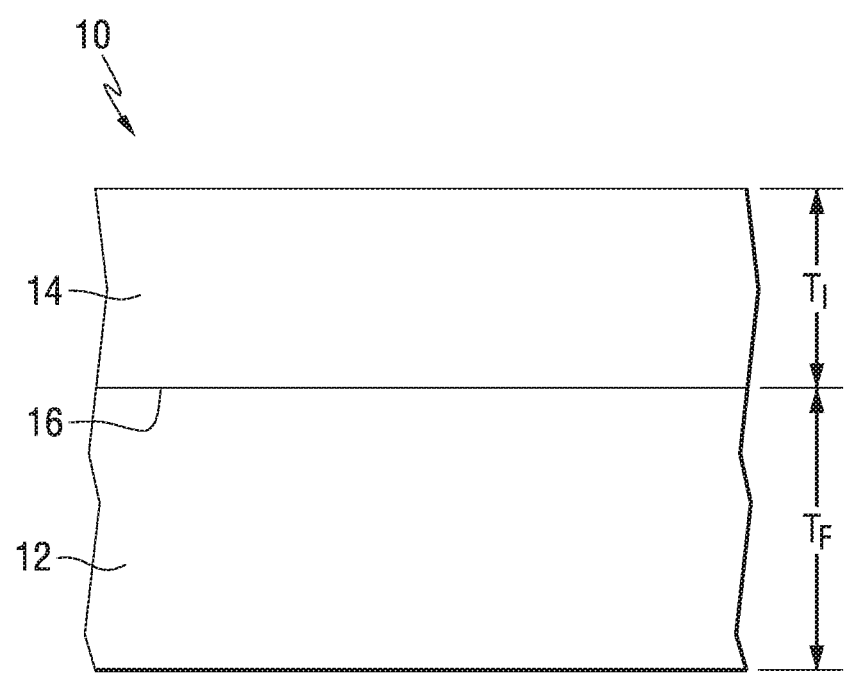
FIG. 1 is a partially schematic side sectional view of a portion of a laminated shower curtain in accordance with an embodiment of the present invention.

FIG. 1 is a partially schematic side sectional view of a portion of a laminated shower curtain 10 in accordance with an embodiment of the present invention, including an antimicrobial pre-treated fabric layer 12 and an antimicrobial liquid impermeable film layer 14. The laminated shower curtain 10 may include an interface 16 between the antimicrobial pre-treated fabric layer 12 and the antimicrobial liquid impermeable film layer 14. When installed, the antimicrobial pre-treated fabric layer 12 may typically face away from the shower or bath, while the antimicrobial liquid impermeable film layer 14 may typically face towards the shower or bath.

The laminated shower curtain 10 may have any suitable dimensions and features, e.g., as found in conventional standard shower curtains. The dimensions of the laminated shower curtain 10 may be varied depending on the size of the shower or bath. For example, the width of the laminated shower curtain 10 may typically range from 3 to 7 feet, or from 4 to 6.5 feet. The height of the laminated shower curtain 10 may typically range from 5 to 9 feet, or from 6 to 8 feet. The laminated shower curtain 10 may comprise a top edge including standard openings or attachment points for conventional shower curtain rings or hooks (not shown). The top, bottom and/or side edges of the laminated shower curtain 10 may include standard edge treatments as found in conventional shower curtains, such as hemming and the like (not shown).

In an embodiment of the invention, the fabric of the antimicrobial pre-treated fabric layer 12 may have a material weight ranging from 10 to 500 grams per square meter (gsm), for example, from 20 to 200 gsm, or from 50 to 100 gsm. In a particular embodiment, the fabric of the antimicrobial pre-treated fabric layer 12 may have a material weight of 70 gsm. As shown in FIG. 1, the antimicrobial pre-treated fabric layer 12 may have a thickness $T_F$, and the antimicrobial liquid impermeable film layer 14 may have a thickness $T_f$. In an embodiment of the laminated shower curtain 10, the antimicrobial pre-treated fabric layer 12 may have a thickness $T_F$ ranging from 0.02 to 3 mm, for example, from 0.05 to 1.5 mm, or from 0.1 to 1 mm, or from 0.2 to 0.75 mm.

In accordance with an embodiment of the present invention, the antimicrobial pre-treated fabric layer 12 may be made from a liquid permeable and gas permeable fabric material, e.g., the fabric may be permeable to liquid water and to water vapor and/or air. The antimicrobial pre-treated fabric layer 12 may be made from knitted or woven fabric material. In accordance with an embodiment of the invention, the antimicrobial pre-treated fabric layer 12 may comprise any suitable synthetic or natural material, such as polyester, nylon, cotton, or the like. In a particular embodiment, the fabric material of the antimicrobial pre-treated fabric layer 12 may comprise polyester.

The first antimicrobial agent of the antimicrobial pre-treated fabric layer 12 may comprise agents that kill microorganisms or inhibit their growth. For example, the first antimicrobial agent may contain at least one metal such as silver, gold, platinum, palladium, iridium, zinc, copper, nickel, tin, titanium, zirconium, molybdenum, iron, antimony, bismuth and the like, or mixtures of these metals with the same or other metals. In certain embodiments, the first antimicrobial agent can comprise at least one such metal in combination with at least one of oxygen, nitrogen, carbon, boron, sulfur, a halogen (e.g., fluorine, chlorine, bromine, iodine) and/or hydrogen. In certain embodiments, the first antimicrobial agent may comprise one or more metal oxide, carbide, hydroxide, nitride, nitrate, chloride, boride, sulfide, sulfate, halide, hydride, or metal salts containing metals as described above. In certain embodiments, the first antimicrobial agent may comprise metal-containing compounds, such as coordination complexes or metal complexes, metal pyrithiones, metal trialkyls, organometallics, microcomposites and the like. The metal(s) components of such compounds may be selected from those listed above.

Examples of suitable coordination complexes or metal complexes may include dehydroabietyl amine, 8-hydroxyquinolinium 2-ethylhexoate, copper naphthenate, copper oleate, silver pyrithione, gold pyrithione, zinc pyrithione, copper pyrithione, palladium (II) complexes, silver acetate, silver (I) carbene, zinc ammonium carbonate, copper ammonium carbonate, zinc borate, and the like. Examples of suitable metal trialkyls may include tributyl tin oxide, tributyl tin acetate, and the like. Examples of suitable organometallics may include copper 8-quinolinolate, and the like. Examples of suitable microcomposites may include silver chloride nanoparticles attached to titanium dioxide as a carrier material and the like.

In accordance with certain embodiments, the first antimicrobial agent may comprise organic compounds such as phenolics, polybiguanides, quarternary ammonium compounds, isothiazolinones, and N-halamine compounds. Examples of suitable phenolics may include triclosan, dalbergin (I) and the like. Examples of suitable polybiguanides may include polyhexamethylene biguanides and the like. Examples of suitable quarternary ammonium compounds may include domiphen bromid, 3-(trihydroxysilyl) propyldimethyl-octadecyl ammonium chloride, benzalkonium chloride, methylbenzethonium chloride, cetalkonium chloride, cetylpyridinium chloride, cetrimide, dofanium chloride, cetrimonium, benzethonium chloride, tetraethylammonium bromide, didecyldimethylammonium chloride, and the like. Examples of suitable isothiazolinones may include methylisothiazolinone, methylchloroisothiazolinone, benzisothiazolinone, octylisothiazolinone, dichlorooctylisothiazolinone, butylbenzisothiazolinone, 5-chloro-2-methyl-4-isothiazolin-3-one, 2-Butyl-1,2-benzisothiazolin-3-one, 2-methyl-4-isothiazolin-3-one, and the like. Examples of N-halamine compounds may include hydantoins, isocyanurates, 1,3-Dichloro-2,2,5,5-tetramethyl-4-imidazolidinone, 1,3-Dibromo-2,2,5,5-tetramethyl-4-imidazolidinone, 1-Bromo-3-chloro-2,2,5,5-tetramethyl-4-imidazolidinone, and the like.

In accordance with certain embodiments, the amount of the first antimicrobial agent contained in or on the antimicrobial pre-treated fabric layer 12 may typically be from 0.1 to 30 weight percent based on the total weight of the fabric of the antimicrobial pre-treated fabric layer 12 and the dry weight of the first antimicrobial agent. For example, the first antimicrobial agent may comprise from 1 to 20 weight percent, or from 2 to 10 weight percent.

In accordance with an embodiment of the present invention, the antimicrobial liquid impermeable film layer 14 may be both a liquid impermeable and a gas impermeable polymeric material, e.g., the film layer 14 is substantially impermeable to liquid water and to water vapor. The antimicrobial liquid impermeable film layer 14 may comprise a continuous film of any suitable polymeric material, such as polyethylene, polypropylene, polyvinyl chloride, polystyrene, nylon, polycarbonate, polytetrafluoroethylene, polyurethane, and the like. In a particular embodiment, the polymeric material of the antimicrobial liquid impermeable film layer 14 may be a polyethylene material.

In an embodiment, the antimicrobial liquid impermeable film layer 14 may have a thickness Tr ranging from 0.02 to 2 mm, for example, from 0.05 to 1 mm, or from 0.1 to 0.5 mm. In a particular embodiment, the antimicrobial liquid impermeable film layer 14 may have a thickness Tr of about 0.2 mm. In an embodiment of the present invention, the thickness TF of the antimicrobial pre-treated fabric layer 12 may be greater than the thickness Tr of the impermeable antimicrobial liquid impermeable film layer 14. In another embodiment, the thicknesses may be the same.

In accordance with an embodiment of the present invention, the antimicrobial liquid impermeable film layer 14 may comprise the second antimicrobial agent dispersed throughout a polymeric matrix of the antimicrobial liquid impermeable film layer 14. In accordance with an embodiment of the invention, the antimicrobial liquid impermeable film layer 14 may be coextruded to form a coextrusion. As used herein, the term "coextrusion", when referring to the antimicrobial liquid impermeable film layer, means that the polymer and the second antimicrobial agent are extruded together into a film comprising a polymeric matrix and the second antimicrobial agent dispersed therein. The antimicrobial liquid impermeable film layer 14 may be a composite layer comprising a polymeric matrix with molecules or particles of the second antimicrobial agent dispersed therein. In accordance with certain embodiments, the second antimicrobial agent may be uniformly dispersed throughout the thickness of the antimicrobial liquid impermeable film layer 14. In other embodiments, the second antimicrobial agent may be non-uniformly dispersed, for example, there may be a greater concentration of the second antimicrobial agent on one or both of the exterior surfaces than in the center of the antimicrobial liquid impermeable film layer 14.

The second antimicrobial agent may comprise agents that kill microorganisms or inhibit their growth. For example, the second antimicrobial agent may contain at least one metal such as silver, gold, platinum, palladium, iridium, zinc, copper, nickel, tin, titanium, zirconium, molybdenum, iron, antimony, bismuth and the like, or mixtures of these metals with the same or other metals. In certain embodiments, the second antimicrobial agent can comprise at least one such metal in combination with at least one of oxygen, nitrogen, carbon, boron, sulfur, a halogen (e.g., fluorine, chlorine, bromine, iodine) and/or hydrogen. In certain embodiments, the second antimicrobial agent may comprise one or more metal oxide, carbide, hydroxide, nitride, nitrate, chloride, boride, sulfide, sulfate, halide, hydride, or metal salts containing metals as described above. In certain embodiments, the second antimicrobial agent may comprise metal-containing compounds, such as coordination complexes or metal complexes, metal pyrithiones, metal trialkyls, organometallics, microcomposites and the like. The metal(s) components of such compounds may be selected from those listed above.

Examples of suitable coordination complexes or metal complexes may include dehydroabietyl amine, 8-hydroxyquinolinium 2-ethylhexoate, copper naphthenate, copper oleate, silver pyrithione, gold pyrithione, zinc pyrithione, copper pyrithione, palladium (II) complexes, silver acetate, silver (I) carbene, zinc ammonium carbonate, copper ammonium carbonate, zinc borate, and the like. Examples of suitable metal trialkyls may include tributyl tin oxide, tributyl tin acetate, and the like. Examples of suitable organometallics may include copper 8-quinolinolate, and the like. Examples of suitable microcomposites may include silver chloride nanoparticles attached to titanium dioxide as a carrier material and the like.

In accordance with certain embodiments, the second antimicrobial agent may comprise organic compounds such as phenolics, polybiguanides, quarternary ammonium compounds, isothiazolinones, and N-halamine compounds. Examples of suitable phenolics may include triclosan, dalbergin (I) and the like. Examples of suitable polybiguanides include polyhexamethylene biguanides and the like. Examples of suitable quarternary ammonium compounds may include domiphen bromid, 3-(trihydroxysilyl) propyldimethyl-octadecyl ammonium chloride, benzalkonium chloride, methylbenzethonium chloride, cetalkonium chloride, cetylpyridinium chloride, cetrimide, dofanium chloride, cetrimonium, benzethonium chloride, tetraethylammonium bromide, didecyldimethylammonium chloride, and the like. Examples of suitable isothiazolinones may include methylisothiazolinone, methylchloroisothiazolinone, benzisothiazolinone, octylisothiazolinone, dichlorooctyli sothiazolinone, butylbenzisothiazolinone, 5-chloro-2-methyl-4-isothiazolin-3-one, 2-Butyl-1,2-benzisothiazolin-3-one, 2-methyl-4-isothiazolin-3-one, and the like. Examples of suitable N-halamine compounds may include hydantoins, isocyanurates, 1,3-Dichloro-2,2,5,5-tetramethyl-4-imidazolidinone, 1,3-Dibromo-2,2,5,5-tetramethyl-4-imidazolidinone, 1-Bromo-3-chloro-2,2,5,5-tetramethyl-4-imidazolidinone, and the like.

In certain embodiments, the amount of the second antimicrobial agent contained in or on the antimicrobial liquid impermeable film layer 14 coextrusion may be from 0.1 to 30 weight percent based on the total weight of the polymeric material of the antimicrobial liquid impermeable film layer 14 and the weight of the second antimicrobial agent. For example, the second antimicrobial agent may comprise from 1 to 20 weight percent, or from 2 to 10 weight percent.

In accordance with certain embodiments, the second antimicrobial agent may be provided in the form of particles having an average particle size ranging from 5 nanometers up to the thickness Tr of the antimicrobial liquid impermeable film layer 14, for example, from 10 nanometers to 1,000 microns, or from 0.1 to 10 microns, or from 0.5 to 5 microns.

Figure 2:
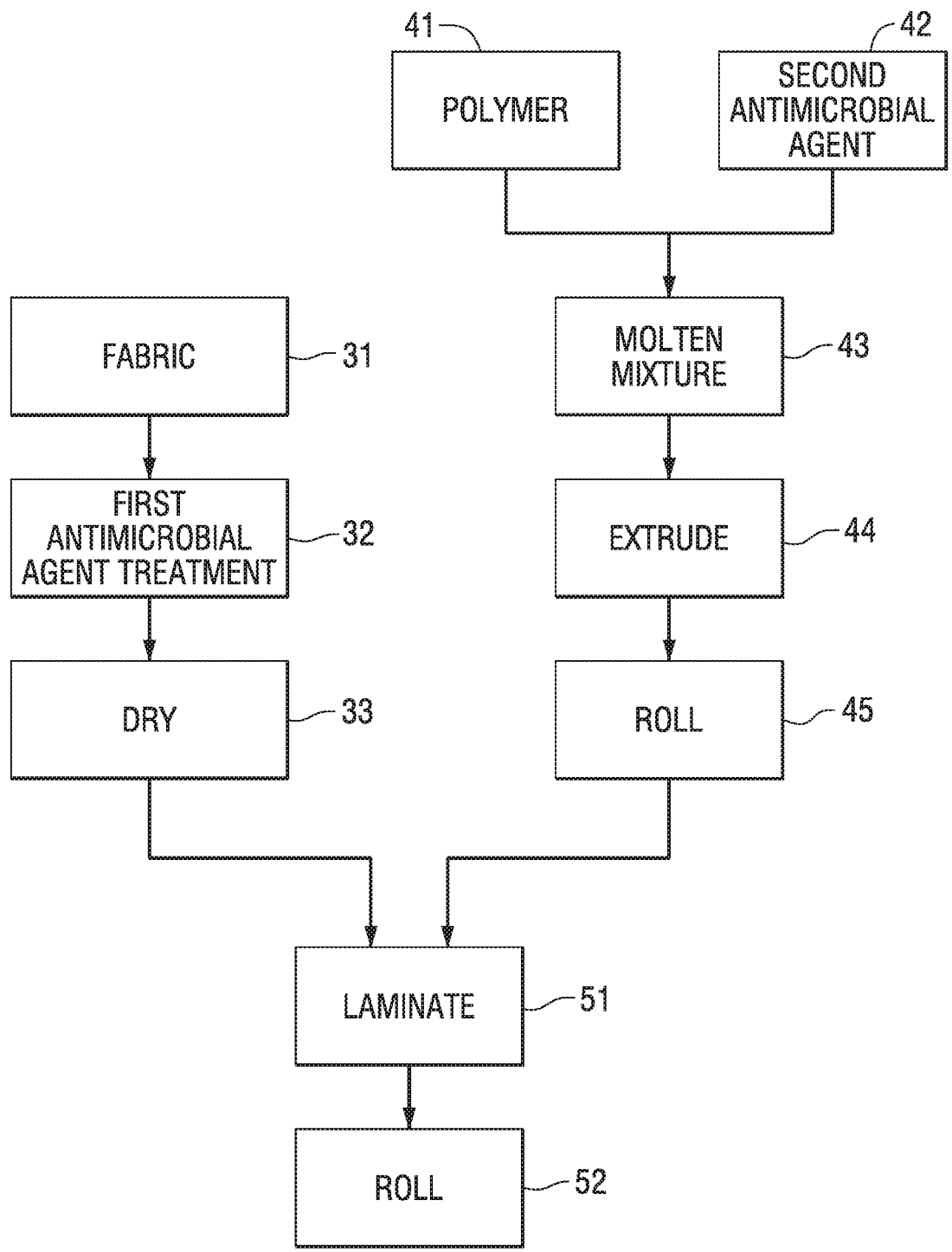
FIG. 2 is a flow chart of the processing steps to make laminated shower curtains in accordance with an embodiment of the present invention.
Figure 3:
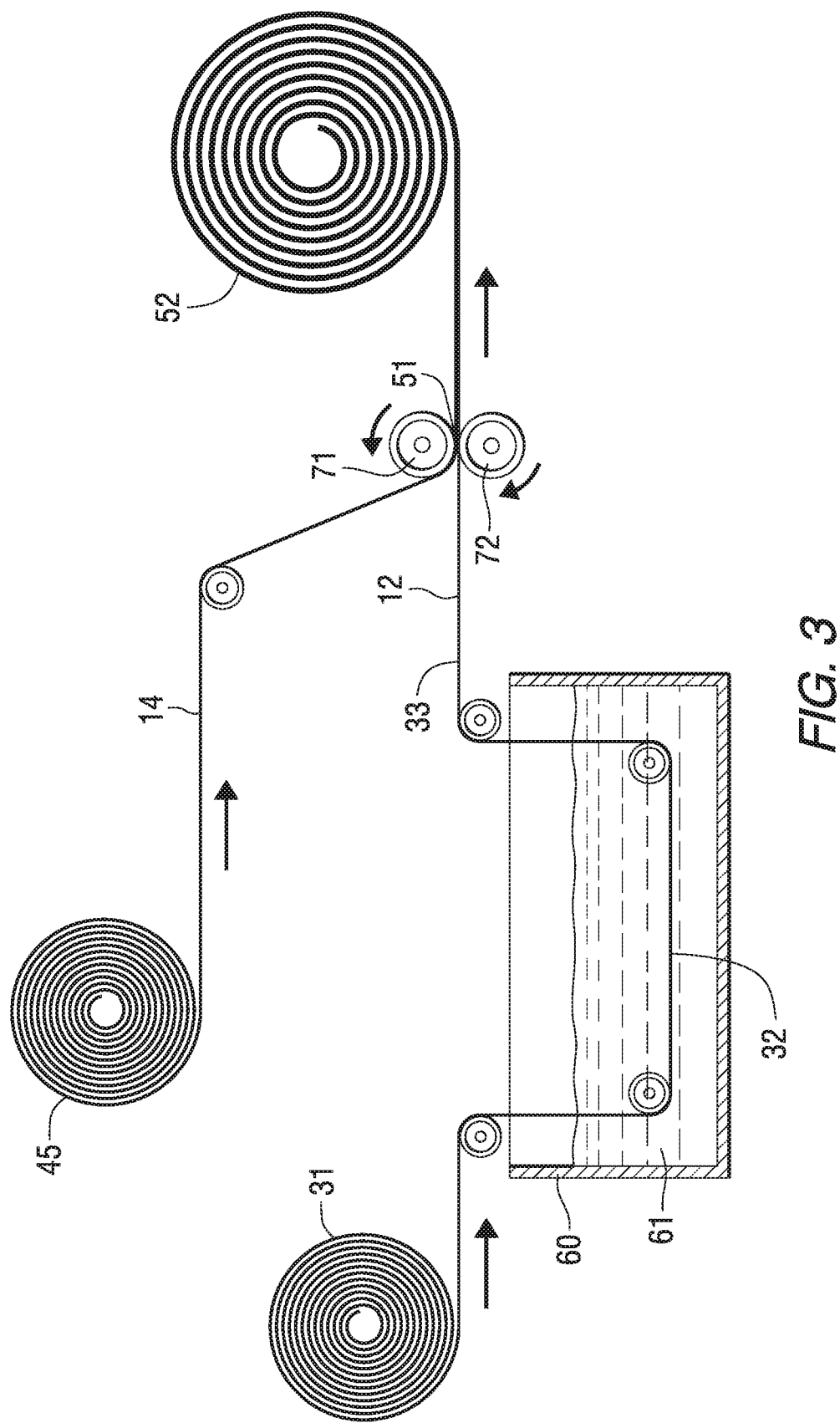
FIG. 3 is a partially schematic illustration of the processing steps to make laminated shower curtains in accordance with an embodiment of the present invention.

FIGS. 2 and 3 schematically illustrate processing steps for producing a laminated shower curtain material that may be used to fabricate a laminated shower curtain 10 in accordance with an embodiment of the present invention. The fabric material of the antimicrobial pre-treated fabric layer 12 may begin on a roll 31. The fabric may then be subjected to an antimicrobial agent treatment 32. As shown in FIG. 3, an antimicrobial agent solution 61 may be contained in a wet bath 60. The fabric may be continuously fed through the wet bath 60 of antimicrobial agent solution 61. The solution 61 may be a water-based aqueous solution or an organic solvent-based solution. The antimicrobial agent treatment 32 may be applied in any other manner, such as spraying, brushing, rolling and the like. After the antimicrobial agent solution 61 is applied to the fabric, the treated fabric layer is allowed to dry 33 to remove the water or organic solvent, and to thereby produce the antimicrobial pre-treated fabric layer 12. In certain embodiments, the drying 33 of the antimicrobial pre-treated fabric layer 12 may include air drying or drying at elevated temperatures. In certain embodiments, after drying 33 of the antimicrobial pre-treated fabric layer 12, the antimicrobial pre-treated fabric layer 12 may be rolled.

As schematically shown in FIGS. 2 and 3, the antimicrobial liquid impermeable film layer 14 may be formed by combining a polymer material 41 and a second antimicrobial agent 42 in an extrusion feeding system. The mixture of the polymer material 41 and the second antimicrobial agent 42 may then be heated to form a molten mixture 43. The molten mixture 43 may then be extruded 44 to form the antimicrobial liquid impermeable film layer 14. The antimicrobial liquid impermeable film layer 14 thus comprises a coextrusion of the polymer material 41 and the second antimicrobial agent 42. In certain embodiments, after the antimicrobial liquid impermeable film layer 14 coextrusion is formed, it may be rolled 45 to form a roll of liquid impermeable film layer 14. In another embodiment, the antimicrobial liquid impermeable film layer 14 may be directly extruded onto the antimicrobial pre-treated fabric layer 12.

As schematically shown in FIGS. 2 and 3, the antimicrobial treatments may be individually applied to the antimicrobial pre-treated fabric layer 12 and the antimicrobial liquid impermeable film layer 14 before they are laminated together. Such individual treatments allow for different antimicrobial agents to be applied to the antimicrobial pre-treated fabric layer 12 and the antimicrobial liquid impermeable film layer 14. The use of different antimicrobial agents allows for the selection of first and second antimicrobial agents that work more effectively with the antimicrobial pre-treated fabric layer 12 and the antimicrobial liquid impermeable film layer 14. In addition, the use of such individual treatments avoids the necessity of treating a single fabric material with both water repellency chemicals and mildew resistant chemicals.

In accordance with certain embodiments, after the antimicrobial pre-treated fabric layer 12 and the antimicrobial liquid impermeable film layer 14 are produced, the antimicrobial liquid impermeable film layer 14 can be deposited on the surface of the antimicrobial pre-treated fabric layer 12 through a lamination process 51. The lamination process 51 may use heat and/or pressure to combine the antimicrobial pre-treated fabric layer 12 and the antimicrobial liquid impermeable film layer 14 into a laminated structure. For example, the antimicrobial liquid impermeable film layer 14, or both the antimicrobial liquid impermeable film layer 14 and antimicrobial pre-treated fabric layer 12, may be heated and passed through a upper nip-roller 71 and a lower nip-roller 72 to thereby bond the antimicrobial pre-treated fabric layer 12 and the antimicrobial liquid impermeable film layer 14 together. In other embodiments, other types of pressure-applying machines may be used. During the lamination process, the antimicrobial liquid impermeable film layer 14 may not significantly infiltrate the antimicrobial pre-treated fabric layer 12, but is sufficiently bonded thereto to prevent delamination during use. In an embodiment of the present invention, no other adhesive is used to combine the antimicrobial pre-treated fabric layer 12 and the antimicrobial liquid impermeable film layer 14. However, an adhesive may be used in other embodiments. When the antimicrobial liquid impermeable film layer 14 is laminated 51 to the antimicrobial pre-treated fabric layer 12, the antimicrobial liquid impermeable film layer 14 provides a continuous film that allows the laminated shower curtains 10 to be both liquid impermeable and gas impermeable. After lamination, the laminated material of the shower curtain 10 may then be rolled 52.

In accordance with the certain embodiments, the roll 52 of the laminated material may be formed into a laminated shower curtain 10 by conventional techniques known to those skilled in the art. For example, the laminated material may be cut to the desired dimensions and conventional edge treatment such as hemming may be applied to the top, bottom and side edges. In addition, the top edge of the laminated shower curtain 10 may be provided with standard holes or attachment points for shower curtain rings or hooks by conventional techniques.

Samples of laminated shower curtain materials of the present invention were tested for mildew resistance against sterilized control samples comprising sterilized filter paper. The tests were conducted in accordance with AATCC Test Method 30-2013 Antifungal activity, Assessment on Textile Materials: Mildew and Rot Resistance of Textile Materials—Test III: Agar Plate: *Aspergillus Niger* ATCC 6275. Three laminated shower curtain materials of the present invention were cut into multiple disc-shaped samples. For each type of laminated shower curtain material tested, one of the test discs was tested on its "Face" side and one of the test discs was tested on its "Back" side. The combined test results are listed in Table 1 below. All of the laminated shower curtain test disc samples corresponding to the present invention exhibited no growth (no test organisms visible by the naked eye or under a microscope; 0% of the surface area of the test disc covered with the test organism), while all of the sterilized control samples exhibited macroscopic growth (visible to the naked eye; 100% of the surface area of the test disc covered with the test organism).

TABLE 1

| | Test Sample | Concentration (Spores/mL) | Fungal growth level on the test discs (7 days) |
|---|---|---|---|
| Face | Treated sample | $1.0 \times 10^6$ | Percentage of surface area of the discs covered with the growth of *Aspergillus Niger*: 0% |
| | Control sample | | Percentage of surface area of the discs covered with the growth of *Aspergillus Niger*: 100% |
| Back | Treated sample | $1.0 \times 10^6$ | Percentage of surface area of the discs covered with the growth of *Aspergillus Niger*: 0% |
| | Control sample | | Percentage of surface area of the discs covered with the growth of *Aspergillus Niger*: 100% |

Whereas particular embodiments of this invention have been described above for purposes of illustration, it will be evident to those skilled in the art that numerous variations of the details of the present invention may be made without departing from the invention as defined in the appended claims.

What is claimed is:

1. A laminated shower curtain comprising:
   an antimicrobial pre-treated fabric layer comprising a first antimicrobial agent; and
   an antimicrobial liquid impermeable film layer bonded to and in contact with the antimicrobial pre-treated fabric layer comprising a polymeric material and a second antimicrobial agent, wherein the antimicrobial liquid impermeable film layer comprises a composite layer including a polymeric matrix with molecules or particles of the second antimicrobial agent dispersed therein, wherein the laminated shower curtain is impermeable to water vapor.

2. The laminated shower curtain of claim 1, wherein the second antimicrobial agent is uniformly dispersed in the antimicrobial liquid impermeable film layer.

3. The laminated shower curtain of claim 1, wherein the second antimicrobial agent is non-uniformly dispersed in the antimicrobial liquid impermeable film layer.

4. The laminated shower curtain of claim 1, wherein the antimicrobial pre-treated fabric layer comprises a liquid permeable and gas permeable fabric material.

5. The laminated shower curtain of claim 1, wherein the antimicrobial pre-treated fabric layer comprises woven or knitted fabric material.

6. The laminated shower curtain of claim 1, wherein the antimicrobial pre-treated fabric layer comprises polyester, nylon, cotton, or a combination thereof.

7. The laminated shower curtain of claim 1, wherein the antimicrobial pre-treated fabric layer has a material weight of from 20 to 200 gsm.

8. The laminated shower curtain of claim 1, wherein the antimicrobial pre-treated fabric layer has a thickness of from 0.01 to 1 millimeter.

9. The laminated shower curtain of claim 1, wherein the amount of the first antimicrobial agent comprises from 1 to 20 weight percent based on the total weight of the fabric of the antimicrobial pre-treated fabric layer and the dry weight of the first antimicrobial agent.

10. The laminated shower curtain of claim 1, wherein the first antimicrobial agent comprises at least one metal, at least one metal compound, at least one organic compound, or a combination thereof.

11. The laminated shower curtain of claim 1, wherein the antimicrobial liquid impermeable film layer comprises a liquid impermeable and gas impermeable material.

12. The laminated shower curtain of claim 1, wherein the antimicrobial liquid impermeable film layer comprises a coextrusion of the polymeric material and the second antimicrobial agent.

13. The laminated shower curtain of claim 1, wherein the polymeric material of the antimicrobial liquid impermeable film layer comprises extruded polyethylene, polypropylene, polyvinyl chloride, polystyrene, nylon, polycarbonate, polytetrafluoroethylene, polyurethane, or a combination thereof.

14. The laminated shower curtain of claim 1, wherein the polymeric material of the antimicrobial liquid impermeable film layer comprises polyethylene.

15. The laminated shower curtain of claim 14, wherein the antimicrobial pre-treated fabric layer comprises polyester.

16. The laminated shower curtain of claim 1, wherein the antimicrobial liquid impermeable film layer has a thickness from 0.05 to 1 millimeter.

17. The laminated shower curtain of claim 1, wherein the second antimicrobial agent comprises at least one metal, at least one metal compound, at least one organic compound, or a combination thereof.

18. The laminated shower curtain of claim 1, wherein the amount of the second antimicrobial agent comprises from 1 to 20 weight percent based on the total weight of the polymeric material of the antimicrobial liquid impermeable film layer and the weight of the second antimicrobial agent.

19. The laminated shower curtain of claim 1, wherein the first antimicrobial agent and the second antimicrobial agent comprise different antimicrobial materials.

20. A method of making a laminated water vapor-impermeable shower curtain material comprising laminating an antimicrobial pre-treated fabric layer comprising a first antimicrobial agent with an antimicrobial liquid impermeable film layer comprising a polymeric material and a second antimicrobial agent to produce a laminated shower curtain material that is impermeable to water vapor, wherein the antimicrobial liquid impermeable film layer is produced by co-extruding a molten mixture of the polymer material and the second antimicrobial agent to thereby form a polymeric matrix with molecules or particles of the second antimicrobial agent dispersed therein.

21. The method of claim 19, wherein the antimicrobial liquid impermeable film layer is bonded to and in contact with the antimicrobial pre-treated fabric layer.

22. The method of claim 19, wherein the second antimicrobial agent is uniformly dispersed in the antimicrobial liquid impermeable polyethylene film layer.

23. The method of claim 19, wherein the second antimicrobial agent is non-uniformly dispersed in the antimicrobial liquid impermeable film layer.

24. The method of claim 19, wherein the antimicrobial liquid impermeable film layer is bonded to the antimicrobial pre-treated fabric layer without the use of an adhesive.

25. The method of claim 19, wherein the antimicrobial pre-treated fabric layer is produced by contacting the fabric layer with the first antimicrobial agent in a wet bath.

26. The method of claim 19, further comprising applying pressure to the antimicrobial pre-treated fabric layer and the antimicrobial liquid impermeable film layer to thereby bond the antimicrobial pre-treated fabric layer and the antimicrobial liquid impermeable film layer together.

27. The method of claim 26, wherein the first antimicrobial agent and the second antimicrobial agent comprise different antimicrobial materials.

28. The method of claim 20, wherein the polymeric material of the antimicrobial liquid impermeable film layer comprises extruded polyethylene, polypropylene, polyvinyl chloride, polystyrene, nylon, polycarbonate, polytetrafluoroethylene, polyurethane, or a combination thereof.

29. The method of claim 20, wherein the polymeric material of the antimicrobial liquid impermeable film layer comprises polyethylene.

30. The method of claim 29, wherein the antimicrobial pre-treated fabric layer comprises polyester.

* * * * *